E. W. STROHN.
CONDENSING APPARATUS.
APPLICATION FILED JUNE 19, 1908.

1,017,338.

Patented Feb. 13, 1912.

Witnesses:
A. G. Dimond.
E. A. Volk.

Inventor:
Emil Wilhelm Strohn,
By Wilhelm, Parker & Hand,
Attorneys.

UNITED STATES PATENT OFFICE.

EMIL WILHELM STROHN, OF BUFFALO, NEW YORK.

CONDENSING APPARATUS.

1,017,338. Specification of Letters Patent. Patented Feb. 13, 1912.

Application filed June 19, 1908. Serial No. 439,288.

*To all whom it may concern:*

Be it known that I, EMIL WILHELM STROHN, a subject of the German Emperor, residing at Buffalo, in the county of Erie and State of New York, have invented a new and useful Improvement in Condensing Apparatus, of which the following is a specification.

This invention relates to condensers which are employed in connection with evaporating vessels operating under a vacuum for recovering highly volatile solvents drawn from such vessels by the vacuum pump. It is well known that the recovery of such solvents when expanded under a vacuum is most difficult even with a surface condenser of relatively large dimensions, particularly as it is rarely possible under ordinary conditions to obtain cooling water of such a low temperature as to condense the escaping solvent completely. In order to recover volatile matter which has escaped the action of this surface condenser, which is arranged between the evaporating vessel and the induction side of the vacuum pump, and operates under a vacuum, it has been customary to add an auxiliary condenser on the exhaust or eduction side of the pump, which auxiliary condenser works under the pressure of the atmosphere, but this auxiliary condenser does not eliminate all loss of volatile matter mainly for the reason that the mixture of air and vapor which is forced through this condenser by the pump travels at too high a velocity to permit of a complete condensation of the volatile matter.

The object of this invention is to avoid this difficulty and to reduce the velocity of the gaseous current passing through the final condenser to such a point that a practically complete condensation of the volatile matter is obtained.

Figure 1:
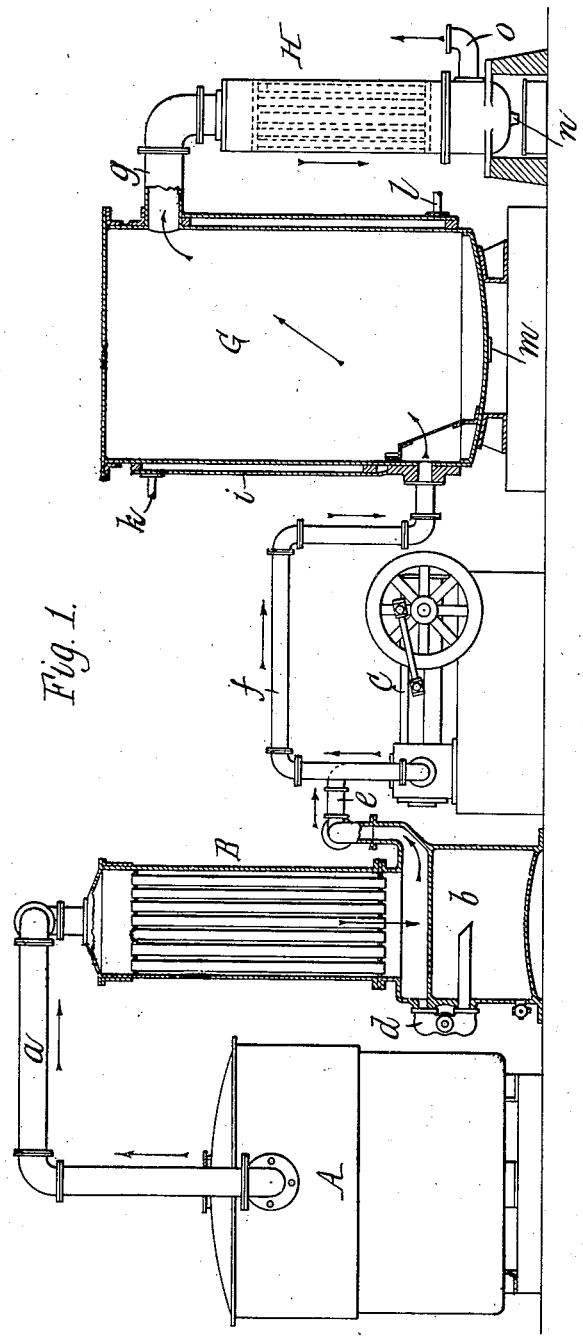
Figure 2:
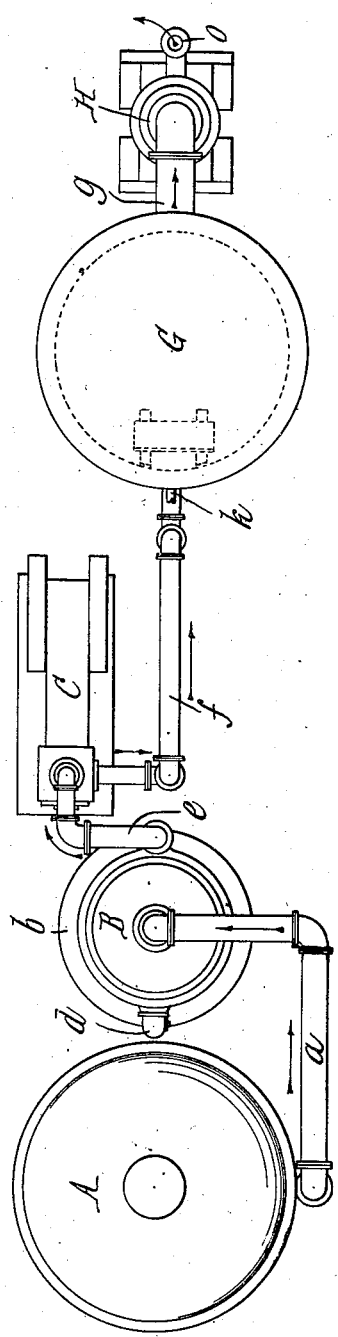

In the accompanying drawings: Figure 1 is a sectional elevation of an apparatus embodying this invention. Fig. 2 is a top plan view of the same.

Like reference characters refer to like parts in the two figures.

A represents an evaporating vessel of any suitable construction, $a$ the pipe through which the air and vapor or volatile matter are drawn from the vessel to the upper end of the surface condenser B which is of any suitable construction and arranged, as usual, between the evaporating vessel and the induction side of the vacuum pump C. This condenser may be provided with the usual reservoir $b$ into which the condensed solvent flows through a by-pass $d$.

$e$ is the pipe which leads from this induction condenser to the induction side of the vacuum pump, and $f$ is the pipe which leads from the eduction side of the pump to an expansion vessel G which is arranged in the eduction passage between the pump and the usual eduction, auxiliary or final condenser H. The pipe $f$ preferably opens into the lower portion of the expansion vessel and the latter is connected with the eduction condenser by a pipe $g$ leading from the upper portion of the expansion vessel to the upper portion of the eduction condenser.

The volume of the expansion vessel is many times larger than that of the pump cylinder and of the final or eduction condenser, so that the mixture of air and vapor which enters the expansion vessel from the pump through the pipe $f$ in puffs expands in the vessel and comes to a state of comparative rest therein and then flows slowly and with a uniform speed through the final or auxiliary condenser, whereby the latter is enabled to act thoroughly upon the solvent still contained in the gaseous mixture and condense the solvent.

The expansion vessel may be provided with a suitable cooling device for recovering a portion of the solvent by condensation in this vessel, for instance, a water jacket $i$ having inlets and outlets $k$ $l$ for the cooling water. The vessel is provided with a discharge $m$ of any suitable construction through which the recovered solvent is delivered.

The final or eduction condenser H is provided at its bottom with a discharge $n$ for the condensed solvent and an exhaust elbow $o$ for the escape of the air.

Various modifications can be made in the apparatus in accordance with the peculiarities of the solvent which is to be recovered. For instance, in some cases the primary condenser B may be omitted and the entire condensation effected in the expansion vessel G and the final condenser H; in other cases the final condenser H may be omitted and the entire condensation effected in the primary condenser and in the expansion vessel.

I claim as my invention:

1. The combination with an evaporating vessel provided with means for evaporating a volatile solvent, and a vacuum pump, of an expansion vessel and a condenser both communicating with the eduction side of the pump and with the atmosphere, said expansion vessel being arranged between the pump and the condenser and permitting the air and vapor discharged by the pump to come to a comparative state of rest before entering the condenser, substantially as set forth.

2. The combination with an evaporating vessel provided with means for evaporating a volatile solvent, a vacuum pump and a condenser through which the air and vapor are drawn by the pump from said vessel, of an expansion vessel and a final condenser through which the gas and vapor are forced by the pump and which communicate with the atmosphere, the expansion vessel being arranged between the eduction side of the pump and the final condenser and permitting the air and vapor discharged by the pump to come to a comparative state of rest before entering the final condenser, substantially as set forth.

3. The combination with an evaporating vessel provided with means for evaporating a volatile solvent, and a vacuum pump by which the air and vapor are drawn from said vessel, of an expansion vessel which communicates with the eduction side of the pump and with the atmosphere and permits the air and vapor to come to a comparative state of rest therein, said vessel being provided with means for condensing the vapor, substantially as set forth.

Witness my hand in the presence of two subscribing witnesses.

EMIL WILHELM STROHN.

Witnesses:
    EDWARD WILHELM,
    C. B. HORNBECK.